(12) United States Patent
Chevrier et al.

(10) Patent No.: US 11,037,567 B2
(45) Date of Patent: Jun. 15, 2021

(54) TRANSCRIPTION OF COMMUNICATIONS (71) Applicant: Sorenson IP Holdings, LLC, Salt Lake City, UT (US)

(72) Inventors: Brian Chevrier, Highland, UT (US); Mark Adams, Lehi, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 266 days.

(21) Appl. No.: 15/875,898

(22) Filed: Jan. 19, 2018

(65) Prior Publication Data
US 2019/0228774 A1 Jul. 25, 2019

(51) Int. Cl.
*G10L 15/26* (2006.01)
*G10L 15/22* (2006.01)
*G10L 15/30* (2013.01)
*G10L 25/78* (2013.01)

(52) U.S. Cl.
CPC .............. *G10L 15/26* (2013.01); *G10L 15/22* (2013.01); *G10L 15/30* (2013.01); *G10L 25/78* (2013.01)

(58) Field of Classification Search
CPC ......... G10L 15/26; G10L 15/22; G10L 15/30; G10L 2015/088; G10L 25/78; H04M 15/00; H04M 15/888; H04M 2201/14; H04M 2201/40; H04M 2203/5027; H04M 3/42221; H04M 3/432; H04M 3/5307; H04M 3/5322
See application file for complete search history.

(56) References Cited

U.S. PATENT DOCUMENTS

| 7,283,624 | B1 | 10/2007 | Meek et al. |
| 9,571,638 | B1 | 2/2017 | Knighton et al. |
| 2001/0034601 | A1 | 10/2001 | Chujo et al. |
| 2003/0143986 | A1 | 7/2003 | Mufti et al. |
| 2007/0064681 | A1 | 3/2007 | Boillot et al. |

(Continued)

FOREIGN PATENT DOCUMENTS

| CN | 104836921 A | 8/2015 |
| DE | 102012100664 A | 8/2013 |

(Continued)

OTHER PUBLICATIONS

Search Report and Written Opinion as received in International Patent Application No. PCT/US2018/066053, dated Apr. 8, 2019.

*Primary Examiner* — Angela A Armstrong
(74) *Attorney, Agent, or Firm* — Maschoff Brennan (57) ABSTRACT

A method to transcribe communications may include obtaining, during a communication session, audio that includes a voice of a user participating in the communication session. The communication session may be configured for verbal communication. The method may further include establishing a network connection with a transcription system and sending the audio to the transcription system. In some embodiments, the transcription system may be configured to generate a transcript of the audio. The method may also include obtaining the transcript of the audio from the transcription system during the communication session and monitoring the audio to determine when the voice is inactive. In some embodiments, in response to the voice being inactive, the method may include stopping the sending of the audio to the transcription system while maintaining the communication session.

16 Claims, 5 Drawing Sheets

(56) References Cited

U.S. PATENT DOCUMENTS

| | | |
|---|---|---|
| 2007/0274284 A1 | 11/2007 | Dendukuri et al. |
| 2008/0255842 A1 | 10/2008 | Simhi |
| 2008/0295040 A1 | 11/2008 | Crinon |
| 2009/0258664 A1 | 10/2009 | Huan |
| 2009/0326939 A1* | 12/2009 | Toner .................. H04M 1/656 704/235 |
| 2011/0103370 A1 | 5/2011 | Igval et al. |
| 2011/0112833 A1* | 5/2011 | Frankel .................. G10L 15/32 704/235 |
| 2011/0149949 A1 | 6/2011 | Bakshi et al. |
| 2011/0150202 A1* | 6/2011 | Cheng .................. H04M 3/432 379/207.03 |
| 2011/0268259 A1 | 11/2011 | Myers et al. |
| 2013/0089189 A1* | 4/2013 | Mikan ................ H04M 3/42221 379/88.14 |
| 2013/0102288 A1 | 4/2013 | Hussain et al. |
| 2014/0126443 A1 | 5/2014 | Chizgi et al. |
| 2015/0080048 A1 | 3/2015 | Fang et al. |
| 2015/0148012 A1 | 5/2015 | Bhide et al. |
| 2015/0373182 A1* | 12/2015 | Tichauer ............... H04M 1/656 455/412.1 |
| 2016/0309011 A1 | 10/2016 | Charugundla |

FOREIGN PATENT DOCUMENTS

| | | |
|---|---|---|
| EP | 1727340 A1 | 11/2006 |
| KR | 20070032421 A | 3/2007 |
| TW | 201125347 A | 7/2011 |

* cited by examiner

TRANSCRIPTION OF COMMUNICATIONS

FIELD

The embodiments discussed herein are related to transcriptions of communications.

BACKGROUND

Some telephone systems may use voltage swings to determine when communication sessions hosted by the telephone systems end. Other telephone systems may use other indicators that communication sessions have ended. However, in some circumstances, telephone systems may not receive a voltage swing or other indicator of an end of a communication session. As a result, the telephone systems may not register an end of communication sessions. Not registering ends of communication sessions may cause operational problems for the telephone systems.

The subject matter claimed herein is not limited to embodiments that solve any disadvantages or that operate only in environments such as those described above. Rather, this background is only provided to illustrate one example technology area where some embodiments described herein may be practiced.

SUMMARY

A method to transcribe communications may include obtaining, during a communication session, audio that includes a voice of a user participating in the communication session. The communication session may be configured for verbal communication. The method may further include establishing a network connection with a transcription system and sending the audio to the transcription system. In some embodiments, the transcription system may be configured to generate a transcript of the audio. The method may also include obtaining the transcript of the audio from the transcription system during the communication session and monitoring the audio to determine when the voice is inactive. In some embodiments, in response to the voice being inactive, the method may include stopping the sending of the audio to the transcription system while maintaining the communication session.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments in this disclosure relate to systems and methods that may be configured to transcribe audio of a communication session. For example, in some embodiments, audio of a communication session may be provided to a transcription system to transcribe the audio from a device that receives and/or generates the audio. A transcription of the audio generated by the transcription system may be provided back to the device. The transcription may assist a user of the device to better understand what is occurring during the communication session.

In some embodiments, the devices and methods described may be configured to determine when the audio does not include spoken words of a participant in the communication session. When the audio does not include spoken words, no transcription of the audio is necessary as there may be nothing to be transcribed. As a result, the audio that does not include spoken words may not be provided to the transcription system. Alternatively or additionally, when the audio does not include spoken words, instead of not providing the audio to the transcription system, a network connection with the transcription system may be terminated. Alternatively or additionally, when the audio does not include spoken words of a participant in the communication session, the communication session may be terminated.

Not sending audio to the transcription system that does not include spoken words for transcription and/or disconnecting a network connection with the transcription system may reduce the network traffic experienced by the transcription system, among other beneficial results. Alternatively or additionally, not sending audio to the transcription system that does not include spoken words for transcription and/or disconnecting a network connection with the transcription system may reduce processing system requirements and/or processing of the transcription system, among other beneficial results. Thus, the methods and systems described in this disclosure may improve the technology and operations of transcription systems and/or communication systems.

Figure 1:
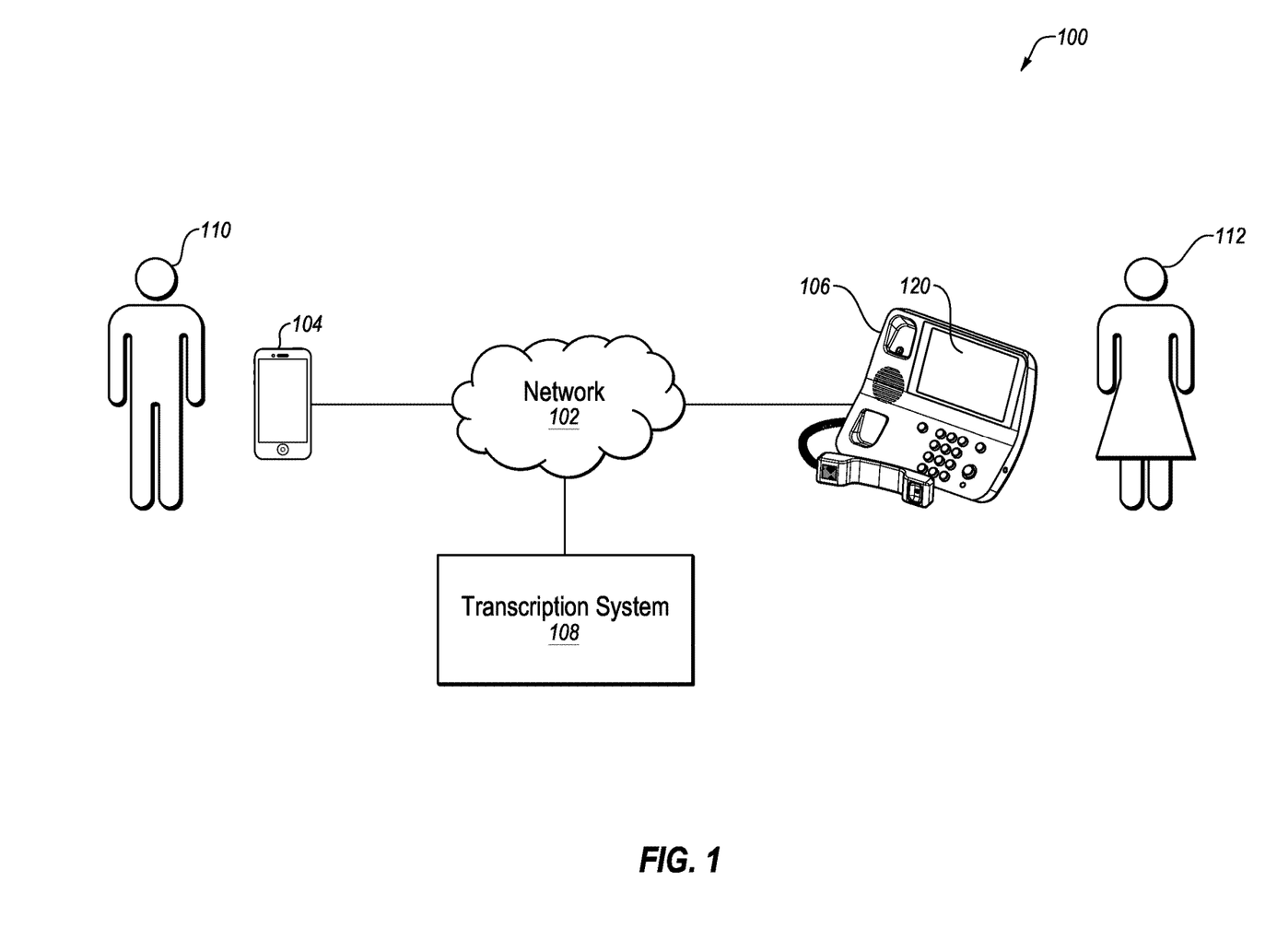
FIG. 1 illustrates an example environment for transcription of communications.

Turning to the figures, FIG. 1 illustrates an example environment 100 for transcription of communications. The environment 100 may be arranged in accordance with at least one embodiment described in the present disclosure. The environment 100 may include a network 102, a first device 104, a second device 106, and a transcription system 108.

The network 102 may be configured to communicatively couple the first device 104, the second device 106, and the transcription system 108. In some embodiments, the network 102 may be any network or configuration of networks configured to send and receive communications between systems and devices. In some embodiments, the network 102 may include a conventional type network, a wired network, an optical network, and/or a wireless network, and may have numerous different configurations. In some embodiments, the network 102 may also be coupled to or may include portions of a telecommunications network, including telephone lines, for sending data in a variety of different communication protocols, such as a plain old telephone system (POTS).

Each of the first and second devices 104 and 106 may be any electronic or digital computing device. For example, each of the first and second devices 104 and 106 may include a desktop computer, a laptop computer, a smartphone, a mobile phone, a tablet computer, a telephone, a phone console, a caption device, a captioning telephone, or any other computing device that may be used for communication between users of the first and second devices 104 and 106.

In some embodiments, each of the first device 104 and the second device 106 may include memory and at least one processor, which are configured to perform operations as described in this disclosure, among other operations. In some embodiments, each of the first device 104 and the second device 106 may include computer-readable instructions that are configured to be executed by each of the first device 104 and the second device 106 to perform operations described in this disclosure.

In some embodiments, each of the first and second devices 104 and 106 may be configured to establish communication sessions with other devices. For example, each of the first and second devices 104 and 106 may be configured to establish an outgoing communication session, such as a telephone call, video call, or other communication session, with another device over a telephone line or network. For example, each of the first device 104 and the second device 106 may communicate over a wireless cellular network, a wired Ethernet network, an optical network, or a POTS line. Alternatively or additionally, each of the first device 104 and the second device 106 may communicate over other wired or wireless networks that do not include or only partially include a POTS. For example, a communication session between the first device 104 and the second device 106, such as a telephone call, may be a voice-over Internet protocol (VOIP) telephone call. As another example, the communication session between the first device 104 and the second device 106 may be a video communication session or other communication session.

In some embodiments, each of the first and second devices 104 and 106 may be configured to obtain audio during a communication session. The audio may be part of a video communication or an audio communication, such as a telephone call. As used in this disclosure, the term audio may be used generically to refer to sounds that may include spoken words. Furthermore, the term "audio" may be used generically to include audio in any format, such as a digital format, an analog format, or a soundwave format. Furthermore, in the digital format, the audio may be compressed using different types of compression schemes. Also, as used in this disclosure, the term video may be used generically to refer to a compilation of images that may be reproduced in a sequence to produce video. Furthermore, the term "video" may be used generically to include video in any format. Furthermore, the video may be compressed using different types of compression schemes.

As an example of obtaining audio, the first device 104 may be configured to obtain first audio from a first user 110. The first audio may include a first voice of the first user 110. The first voice of the first user 110 may be words spoken by the first user. For example, the first device 104 may obtain the first audio from a microphone of the first device 104.

The second device 106 may also be configured to obtain second audio from a second user 112. The second audio may include a second voice of the second user 112. The second device 106 may obtain the second audio from a microphone of the second device 106. During the communication session, the first device 104 may provide the first audio to the second device 106. Alternatively or additionally, the second device 106 may provide the second audio to the first device 104. Thus, during a communication session, both the first device 104 and the second device 106 may obtain both the first audio from the first user 110 and the second audio from the second user 112.

In some embodiments, each of the first and second devices 104 and 106 may be configured to monitor the first audio and the second audio. For example, the second device 106 may be configured to monitor the first audio to determine when the first voice of the first user 110 is active or inactive.

The first voice of the first user 110 in the first audio may be active when the first audio includes spoken words of the first user 110. For example, the first voice may be active when the first audio represents captured sound that includes the first user 110 speaking. The first voice of the first user 110 in the first audio may be inactive when the first audio does not include spoken words of the first user 110. For example, the first voice may be inactive when the first audio represents captured sound that does not include the first user 110 speaking. Thus, the first voice may be inactive when the first audio has sounds, such as music and crying, or other sounds that are not spoken words.

The second voice of the second user 112 in the second audio may be active when the second audio includes spoken words of the second user 112. The second voice of the second user 112 in the second audio may be inactive when the second audio does not include spoken words of the second user 112.

Alternatively or additionally, each of the first and second devices 104 and 106 may be configured to communicate with other systems over a network, such as the network 102 or another network. In these and other embodiments, each of the first device 104 and the second device 106 may receive data from and send data to the transcription system 108.

In some embodiments, each of the first and second devices 104 and 106 may be configured to perform operations to monitor the first audio and the second audio. When monitoring the first audio and the second audio, the first and second devices 104 and 106 may be configured to determine whether the first and/or the second voices of the first and second audio are active or inactive.

In response to the monitoring, each of the first and second devices 104 and 106 may be configured to perform operations. For example, each of the first and second devices 104 and 106 may be configured to stop sending or start sending audio to the transcription system 108 based on the monitoring of the first audio and the second audio. Alternatively or additionally, each of the first and second devices 104 and 106 may be configured to terminate or establish a network connection with the transcription system 108 based on the monitoring of the first audio and the second audio. Alternatively or additionally, each of the first and second devices 104 and 106 may be configured to terminate a communication session between the first and second devices 104 and 106 based on the monitoring of the first audio and the second audio.

In some embodiments, the transcription system 108 may include any configuration of hardware, such as processors, servers, and database servers that are networked together and configured to perform a task. For example, the transcription system 108 may include one or multiple computing systems, such as multiple servers that each include memory and at least one processor. The multiple computing systems may be networked together and configured to perform operations of transcribing audio of communication sessions, such as audio or video calls. The communication sessions may be between devices such as the second device 106 and another device as described in this disclosure. In these and other embodiments, the transcription system 108 may operate to generate transcriptions of audio of one or more parties in a communication session. For example, the transcription system 108 may generate transcriptions of audio generated by other devices and not the second device 106 or both the second device 106 and other devices, among other configurations. After generation of the transcriptions of audio, the transcription system 108 may provide the transcriptions to first device 104 and/or the second device 106.

In some embodiments, the transcription system 108 may include a transcription engine to generate a transcription of the audio. In these and other embodiments, the transcription engine may use automated speech recognition technology, such as a speech recognition computer program, to generate a transcription of the audio. Alternatively or additionally, the transcription system 108 may use one or more networked transcription engines to generate a transcription of the audio. In these and other embodiments, the transcription system 108 may manage the generation of the transcription of the audio.

Alternatively or additionally, the transcription system 108 may provide the audio to a remote call assistant that may listen to the audio. The remote call assistant may "revoice" words in the audio to generate second audio. The transcription system 108 may provide the second audio to a speech recognition computer program tuned to the voice of the remote call assistant. The speech recognition computer program may generate the transcription of the audio.

In some embodiments, the transcription system 108 may operate as an exchange configured to establish communication sessions, such as audio (e.g., telephone calls), video calls, etc., between devices such as the second device 106 and another device or other devices as described in this disclosure, among other operations. In some embodiments, the transcription system 108 may include computer-readable instructions that are configured to be executed by the transcription system 108 to perform operations described in this disclosure.

An example of the operation of the environment 100 is now provided. A communication session may be established between the first device 104 and the second device 106. During the communication session, the first device 104 and the second device 106 may be communicatively coupled using networking protocols. During the communication session, the first audio from the first device 104 may be provided to the second device 106 and the second audio from the second device 106 may be provided to the first device 104. In these and other embodiments, the first device 104 may be configured to present the second audio and the second device 106 may be configured to present the first audio. The first device 104 may present the second audio by broadcasting the audio through a speaker to allow the first user 110 to hear the second audio. The second device 106 may present the first audio by broadcasting the audio through a speaker to allow the second user 112 to hear the first audio.

In this example, the second user 112 may be a hearing-impaired user. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others. Thus, the second user 112 may struggle to understand the first audio presented by the second device 106.

To assist the second user 112 during the communication session, a transcript of the first audio from the first device 104 may be generated by the transcription system 108 and provided to the second device 106. The second device 106 may present the transcript of the first audio on a display 120 of the second device 106. In these and other embodiments, the text may allow the second user 112 to supplement the first audio and confirm their understanding of the words spoken by the first user 110.

To generate the transcript of the first audio, the second device 106 may establish a network connection with the transcription system 108. After establishing the network connection, the second device 106 may provide the first audio to the transcription system 108. The transcription system 108 may generate a transcript of the first audio and provide the transcript to the second device 106 for presentation to the second user 112. The transcription of the communication session may occur in real-time. As a result, the second device 106 may present the transcript of the first audio on the display 120 at substantially the same time as presentation of the first audio to the second user 112 during the communication session. As used herein, the term "at substantially the same time" may refer to a time lag between the presentation of the first audio and the transcript of 1, 2, 5, 10, or 15 seconds.

During the communication session, the second device 106 may also monitor the first voice of the first audio and the second voice of the second audio. In response to inactivity of the first voice and/or the second voice, the second device 106 may perform various actions. For example, the second device 106 may be configured to stop sending the first audio to the transcription system 108, terminate the network connection with the transcription system 108, and/or terminate the communication session with the first device 104.

For example, in response to the first voice being inactive, the second device 106 may be configured to stop sending the first audio to the transcription system 108. Alternatively or additionally, in response to the first voice being inactive, the second device 106 may be configured to terminate the network connection with the transcription system 108.

In some embodiments, the second device 106 may stop sending the first audio to the transcription system 108 in response to the first voice being inactive for longer than a first time period threshold. The first time period threshold may be based on analytics of conversations between humans. For example, the first time period threshold may be based on periods of silence for one speaker in conversations between humans.

In these and other embodiments, the second device 106 may terminate the network connection with the transcription system 108 in response to the first voice being inactive for longer than a second time period threshold. The second time period threshold may be longer than the first time period threshold. The second time period threshold may be based on analytics of conversations between humans. For example, the second time period threshold may be based on periods of silence for one speaker in conversations between humans that indicates that the conversation has ended.

Alternatively or additionally, in response to the first voice becoming active after the first time period threshold and before the second time period threshold, the second device 106 may again send the first audio to the transcription system 108. Alternatively or additionally, in response to the first voice becoming active after the second time period threshold, the second device 106 may again establish a network connection with the transcription system 108 and again send the first audio to the transcription system 108.

Alternatively or additionally, the second device 106 may be configured to stop sending the first audio to the transcription system 108 and to terminate the network connection with the transcription system 108 in response to the first voice and the second voice being inactive for longer than a third time period threshold. The third time period threshold may be based on analytics of conversations between humans. For example, the third time period threshold may be based on periods of silence in conversations between humans or in voice messages. For example, when both sides of a conversation are silent for a certain period, it may indicate that there is a lull in the conversation or that the conversation is likely ended. Additionally, when a speaker of a message is silent for a certain period, it may indicate that the speaker is gathering their thoughts or the message is likely ended.

Alternatively or additionally, the second device 106 may be configured to stop sending the first audio to the transcription system 108 based on the first voice being inactive and to terminate the network connection with the transcription system 108 in response to the first voice and the second voice being inactive for longer than a fourth time period threshold. The fourth time period threshold may be based on analytics of conversations between humans. For example, the fourth time period threshold may be based on periods of silence in conversations between humans or in voice messages that have a high probability that the conversation or voice message is over.

Alternatively or additionally, in response to the first voice and the second voice being inactive, the second device 106 may be configured to terminate the communication session with the first device 104. In these and other embodiments, the second device 106 may terminate the communication session with the first device 104 after the second device 106 has stopped sending the first audio to the transcription system 108 and terminated the network connection with the transcription system 108. As such, the longer that the first voice and/or the second voice are inactive, the second device 106 may perform additional actions until the communication session with the first device 104 is terminated.

In addition to generating transcriptions of communication sessions, the environment 100 may be configured to provide transcriptions of communications from other devices, such as the first device 104. The communications may be messages, such as video messages or audio messages. The communications may be stored locally on the second device 106 or on a database accessed over the network 102 by the second device 106.

For example, the second device 106 may be configured to function as a local "answering machine." In these and other embodiments, the first user 110 may attempt to communicate, e.g., calling, the second device 106 using the first device 104. When the attempt fails, the first user 110 may leave a message, such as a voice or video message, that may be stored on the second device 106 or another database when a communication request is sent to the second device 106. Later, the second user 112 may employ the second device 106 to play back the message. During play back of the message, the second device 106 may be configured to provide message audio of the message to the transcription system 108. The transcription system 108 may generate a real-time transcription of the message audio and provide the transcription to the second device 106 for presentation to the second user 112.

Alternatively or additionally, during play back of the message, the second device 106 may be configured to monitor a message voice of the message audio. In response to inactivity of the message voice, the second device 106 may be configured to stop sending the message audio to the transcription system 108, terminate the network connection with the transcription system 108, or terminate play back of the message. In some embodiments, the longer that the message voice is inactive, the second device 106 may perform additional actions until the play back of the message is terminated. For example, after a first time period threshold of message voice inactivity, the second device 106 may stop sending the message audio to the transcription system 108. Alternatively or additionally, after a second time period threshold of message voice inactivity that is longer than the first time period threshold, the second device 106 may terminate the network connection with the transcription system 108. Alternatively or additionally, after a third time period threshold of message voice inactivity that is longer than the second time period threshold, the second device 106 may terminate play back of the message.

Modifications, additions, or omissions may be made to the environment 100 without departing from the scope of the present disclosure. For example, in some embodiments, the first user 110 may also be hearing-impaired. In these and other embodiments, the transcription system 108 may provide text to the first device 104 based on the second audio transmitted by the second device 106. Alternatively or additionally, the transcription system 108 may include additional functionality. For example, the transcription system 108 may edit the text or make other alterations to the text after presentation of the text on the second device 106. Alternatively or additionally, in some embodiments, the environment 100 may include additional devices similar to the first and second devices 104 and 106. In these and other embodiments, the similar devices may be configured to present communications as described in this disclosure.

Figure 2:
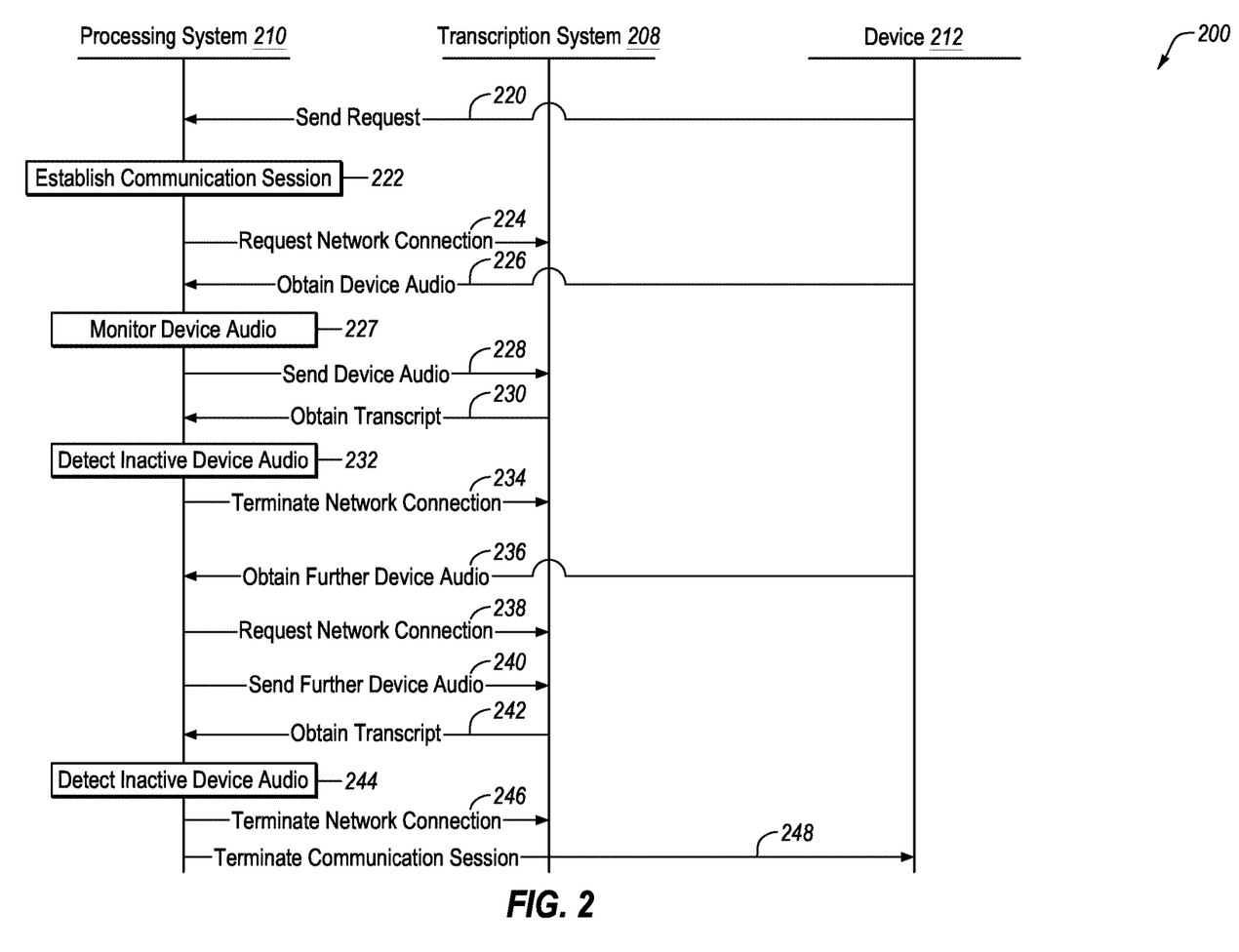
FIG. 2 illustrates example operations to transcribe communications.

FIG. 2 illustrates example operations 200 to transcribe communications. The operations 200 may be arranged in accordance with at least one embodiment described in the present disclosure. The operations 200 may be between a transcription system 208, a processing system 210, and a device 212. In some embodiments, the processing system 210, may be part of a device that may be analogous to the second device 106 of FIG. 1. In these and other embodiments, the processing system 210 may be a combination of hardware devices, such as processors, memory, modems, and other hardware devices that perform the functions described herein. Alternatively or additionally, the transcription system 208 may be analogous to the transcription system 108 of FIG. 1 and the device 212 may be analogous to the first device 104 of FIG. 1. Accordingly, no further explanation is provided with respect thereto.

In some embodiments, the operations 200 may be an example of communications and interactions between the transcription system 208, the processing system 210, and the device 212. Generally, the operations 200 may relate to transcription of audio of a communication session between the processing system 210 and the device 212. The interactions between the transcription system 208, the processing system 210, and the device 212 may occur over one or more networks. The operations 200 illustrated are not exhaustive but are merely representative of operations 200 that may occur. Furthermore, one operation as illustrated may represent one or more communications, operations, and/or data exchanges.

At operation 220, the device 212 may send a request for a communication session to the processing system 210. At operation 222, the processing system 210 may establish a communication session with the device 212. The processing system 210 may establish the communication session using networking protocols. After the communication session is established, the processing system 210 may direct audio to the device 212 and the processing system 210 may obtain audio sent by the device 212.

At operation 224, the processing system 210 may request a network connection with the transcription system 208. The processing system 210 may request a network connection using network protocols and addresses that are associated with the transcription system 208. The network connection with the transcription system 208 may allow the processing system 210 to communicate with the transcription system 208. The communication with the transcription system 208 may include the processing system 210 sending device audio from the device 212 to the transcription system 208 and the processing system 210 obtaining transcripts of the device audio from the transcription system 208.

At operation 226, the processing system 210 may obtain device audio from the device 212. The device audio may include device voice. The device voice may be words spoken by a user of the device 212 that are captured by the device 212 and provided in the device audio to the processing system 210.

At operation 227, in response to obtaining the device audio from the device 212, the processing system 210 may monitor the device audio. The processing system 210 may monitor the device audio with respect to device voice in the device audio. For example, the processing system 210 may monitor the device audio to determine if the device voice is active or inactive. The processing system 210 may be further configured to monitor a length of time that the device voice is inactive. At operation 228, in response to receiving the device audio, the processing system 210 may provide the device audio to the transcription system 208.

At operation 230, the processing system 210 may obtain a transcript of the device audio from the transcription system 208. The transcription system 208 may generate the transcript of the device audio using an automated speech recognition protocol. At operation 232, the processing system 210 may determine that the device voice has been inactive for longer than a first time period.

At operation 234, in response to determining that the device voice has been inactive for longer than the first time period threshold, the processing system 210 may terminate the network connection with the transcription system 208. Terminating the network connection with the transcription system 208 may involve tearing down the network connection and freeing the ports used in the network connection for other network connections.

At operation 236, the processing system 210 may receive further device audio from the device 212. The further device audio may include active device voice. The processing system 210, while monitoring the further device audio, may determine that the device voice is now active.

At operation 238, in response to the device voice of the further device audio being active, the processing system 210 may request another network connection with the transcription system 208. At operation 240, in response to establishing a network connection, the processing system 210 may send the further device audio to the transcription system 208. At operation 242, the processing system 210 may obtain a transcript of the further device audio from the transcription system 208.

At operation 244, the processing system 210 may determine that the device voice has again been inactive for longer than a first time period threshold based on monitoring of the further device audio. At operation 246, in response to determining that the device voice has been inactive for longer than the first time period threshold, the processing system 210 may again terminate the network connection with the transcription system 208. The processing system 210 may continue to monitor the device voice of the further device audio.

At operation 248, in response to determining that the device voice has been inactive for longer than a second time period threshold that is greater than the first time period threshold, the processing system 210 may terminate the communication session with the device 212.

Modifications, additions, or omissions may be made to the operations 200 without departing from the scope of the present disclosure. For example, in some embodiments, the operations 200 may not include one or more of the operations. For example, the operations 200 may not include the operations 234 and 238. In these and other embodiments, instead of terminating the network connection in operation 234, the processing system 210 may stop sending the device audio to the transcription system 208. Alternatively or additionally, instead of requesting a network connection in operation 238, the processing system 210 may again start sending the device audio to the transcription system 208. As another example, in some embodiments, the operations 200 may be arranged in a different order. For example, the operation 227 may occur before the operation 228.

In some embodiments, the audio exchanged between the processing system 210 and the device 212 may be a communication session between the processing system 210 and the device 212. In these and other embodiments, the operations 200 may include additional operations. For example, the operations 200 may include the processing system 210 providing audio to the device 212.

In some embodiments, the audio exchanged between the processing system 210 and the device 212 may be a message. In these and other embodiments, the device 212 may be a database that stores the message. In some embodiments, the device 212 and the processing system 210 may be part of a single device, such as a mobile phone or a phone console. In these and other embodiments, the device 212 may be a memory component of the single device and the operations 234 and 238 may not be included as described above. Alternatively or additionally, the device 212 may be a database that is connected over a network, such as the network 102 of FIG. 1.

Figure 3:
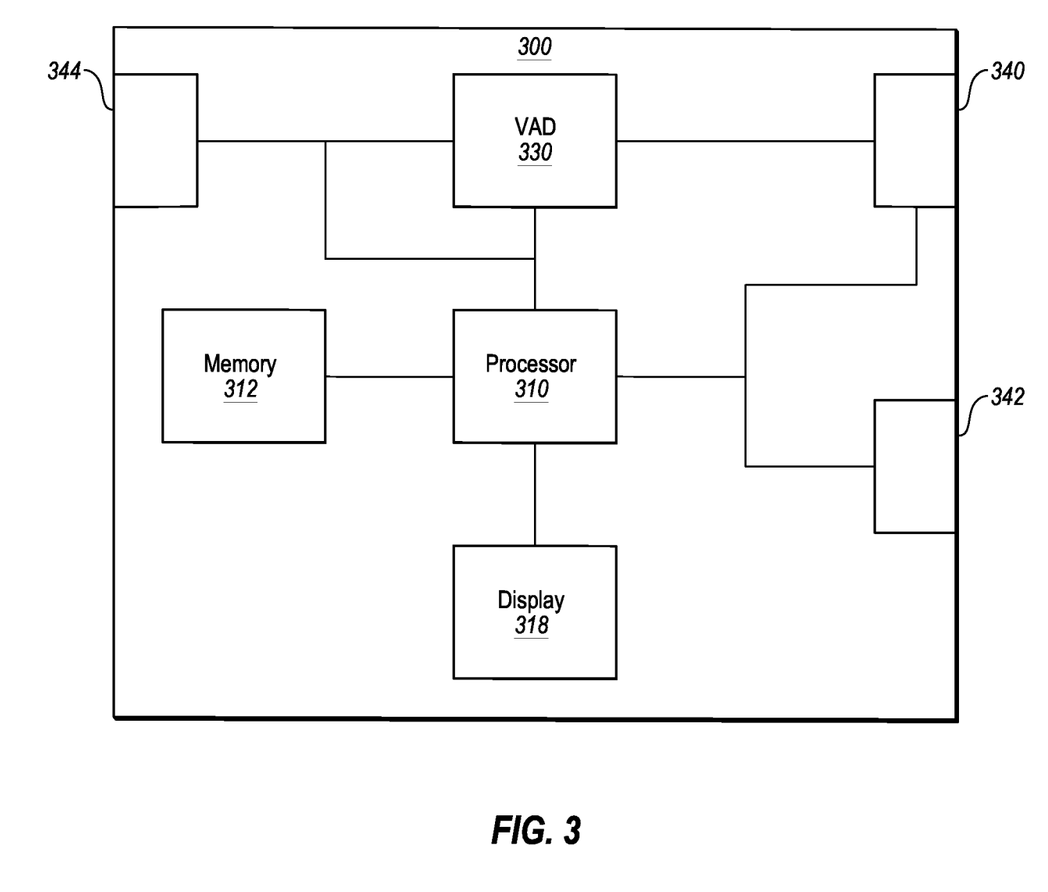
FIG. 3 illustrates an example system that may be used during transcription of communications.

FIG. 3 illustrates an example system 300 that may be used during transcription of communications. The system 300 may be arranged in accordance with at least one embodiment described in the present disclosure. The system 300 may include a processor 310, a memory 312, a display 318, a voice activity detector ("VAD") 330, a first communication interface 340, a second communication interface 342, and a third communication interface 344, which may be communicatively coupled. In some embodiments, the system 300 may be part of any of the systems or devices described in this disclosure. For example, the system 300 may be part of any of the second device 106 of FIG. 1 or the processing system 210 of FIG. 2.

Generally, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof.

Although illustrated as a single processor in FIG. 3, it is understood that the processor 310 may include any number of processors distributed across any number of networks or physical locations that are configured to perform individually or collectively any number of operations described herein. In some embodiments, the processor 310 may interpret and/or execute program instructions and/or process data stored in the memory 312. In some embodiments, the processor 310 may fetch program instructions from a first portion of the memory 312 and load the program instructions into a second portion of the memory 312.

After the program instructions are loaded into the second portion of the memory 312, the processor 310 may execute the program instructions. For example, the system 300 may be part of the first device 104 or the second device 106 of FIG. 1. In these and other embodiments, the instructions may include causing the second devices 106 to monitor the voice audio for inactivity.

The memory 312 may include computer-readable storage media for carrying or having computer-executable instructions or data structures stored thereon. Such computer-readable storage media may be any available media that may be accessed by a general-purpose or special-purpose computer, such as the processor 310. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 310 to perform a certain operation or group of operations, such as one or more operations of the operations 200 and/or one or more blocks of the methods 400 and 500. The memory 312 may also include other types of memory.

The display 318 may be configured as one or more displays, like an LCD, LED, or other type display. The display 318 may be configured to present video, text, user interfaces, and other data as directed by the processor 310. For example, the display 318 may be configured to display transcripts received by the processor 310 over the second communication interface 342.

The VAD 330 may be a voice activity detector that is configured to analyze audio. In some embodiments, the VAD 330 may be configured to monitor audio for voice in the audio. In these and other embodiments, the VAD 330 may determine if voice is active or inactive in audio. The VAD 330 may determine if voice is active or inactive in audio by analyzing the audio for unique audio signatures of human speech. For example, the VAD 330 may monitor the audio for pitch excitation and pitch periods unique to the human speech. Alternatively or additionally, the VAD 330 may monitor the audio for formats in resonance frequencies that are associated with the human speech. Based on the audio including unique audio signatures of human speech, the VAD 330 may determine that the audio includes active voice. When the unique audio signatures of human speech are not present in the audio, the VAD 330 may determine that the audio includes inactive voice. The VAD 330 may provide information about the activity or inactivity of voice in audio to the processor 310.

The first communication interface 340 may be configured to maintain a communication session with another device over a network. The other device may be a communication device analogous to the first device 104 of FIG. 1. In these and other embodiments, the first communication interface 340 may receive audio from the other device during the communication session. Alternatively or additionally, the other device may be a server coupled to a database that stores audio messages. The first communication interface 340 may provide the audio from the other device to the VAD 330 for monitoring of the audio.

The third communication interface 344 may be configured to receive audio from a microphone. In these and other embodiments, the third communication interface 344 may receive audio based on sounds made by a user of the system 300. The third communication interface 344 may provide the audio from the microphone to the VAD 330 for monitoring of the audio.

The second communication interface 342 may be configured to handle communications between the system 300 and a transcription system. In these and other embodiments, the processor 310 may direct audio from the first communication interface 340 and the second communication interface 342. In some embodiments, the processor 310 may stop or start sending audio from the first communication interface 340 to the second communication interface 342 based on monitoring of the audio by the VAD 330. Alternatively or additionally, the processor 310 may terminate or establish a network connection through the second communication interface 342 based on monitoring of the audio by the VAD 330. Alternatively or additionally, the processor 310 may terminate the communication session maintained over the first communication interface 340 based on monitoring of the audio by the VAD 330.

Modifications, additions, or omissions may be made to the system 300 without departing from the scope of the present disclosure. For example, the VAD 330 is illustrated as separate from the processor 310. However, in some embodiments, the VAD 330 may be implemented in software by the processor 310. Alternatively or additionally, the VAD 330 may be part of the processor 310, such as a sub-processor of the processor 310 when the processor 310 includes multiple processors. Alternatively or additionally, the VAD 330 may be part of a vocoder or codec.

Figure 4:
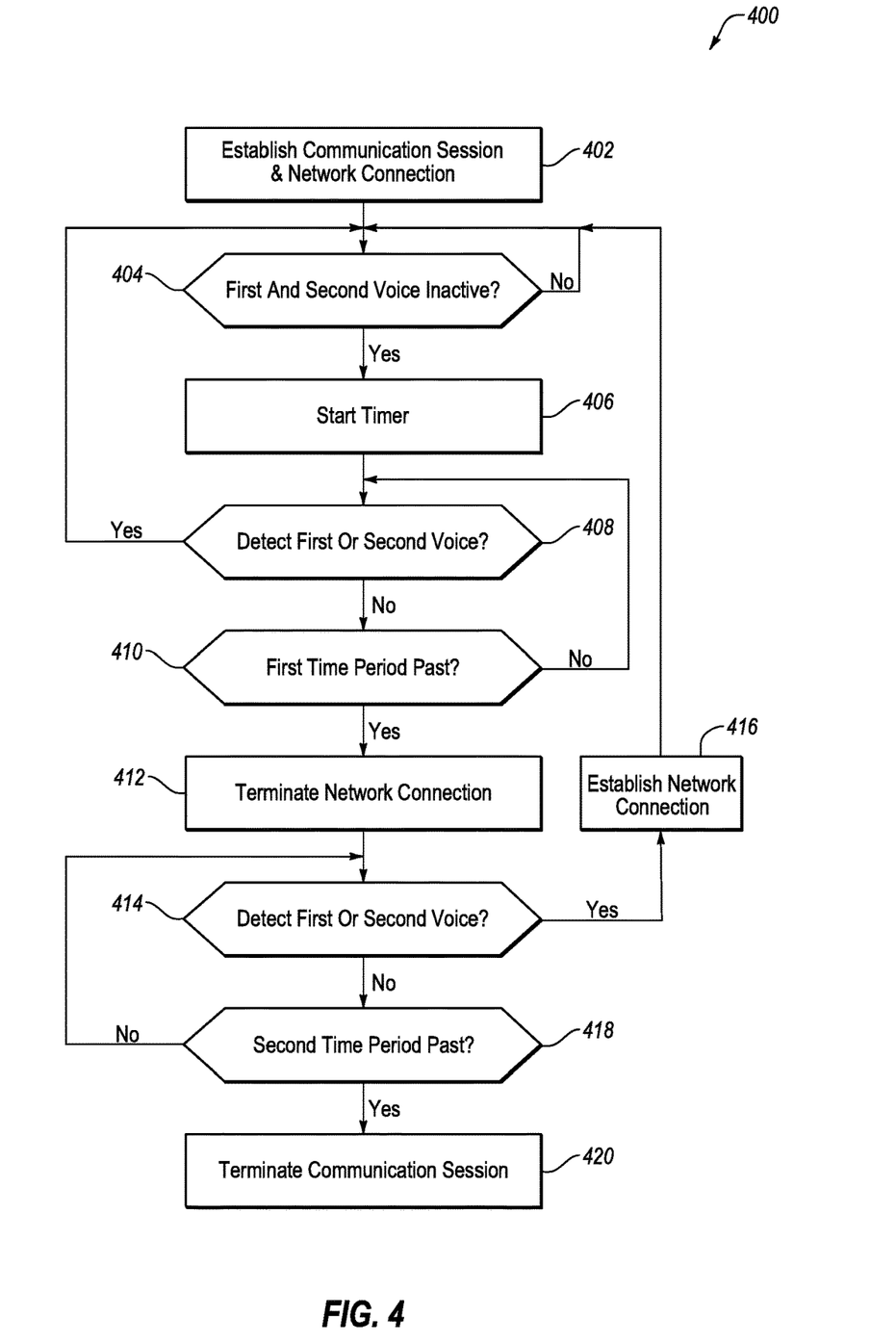
FIG. 4 is a flowchart of an example method to transcribe communications.

FIG. 4 is a flowchart of an example method 400 to transcribe communications. The method 400 may be arranged in accordance with at least one embodiment described in the present disclosure. The method 400 may be performed, in some embodiments, by a device or system, such as the second device 106 of FIG. 1 or the system 300 of FIG. 3, or another device. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where a communication session may be established. In some embodiments, the communication session may be established between a first device and a second device. In these and other embodiments, during the communication session, the first device may provide first audio, which may include first voice, to the second device. Also, during the communication session, the second device may provide second audio, which may include second voice, to the first device. In some embodiments, the communication session may be a video or audio call between the first device and the second device. In these and other embodiments, the first device may be analogous to the first device 104 of FIG. 1.

Additionally, at block 402, a network connection may also be established with a transcription system. In some embodiments, the network connection may be established between the second device and the transcription system. After establishing the network connection, the first audio may be provided to the transcription system.

At block 404, it may be determined if both the first voice and second voice are inactive. It may be determined that the first voice and second voice are inactive based on monitoring of the first audio and the second audio. When the first voice and the second voice are inactive, the method 400 may proceed to block 406. When one of the first voice and the second is active, the method 400 may proceed back to block 404.

At block 406, a timer may be started. The timer may be used to determine how long the first and second voices are inactive.

At block 408, it may be determined if the first voice or the second voice are detected. The first voice or the second voice being detected may indicate that the first voice, the second voice, or both the first voice and the second voice are active. The first voice and second voice may be detected based on monitoring of the first audio and the second audio. When the first voice and the second voice remain inactive, the method 400 may proceed to block 410. When one or both of the first voice and the second voice are detected, the method 400 may proceed to block 404.

At block 410, it may be determined if a first time period has passed. The determination of whether the first time period has passed may be based on a comparison of the time indicated by the timer and a first time period threshold. When the first time period has passed, the method 400 may proceed to block 412. When the first time period has not passed, the method 400 may proceed to block 408.

At block 412, the network connection with the transcription system may be terminated. Terminating the network connection may include tearing down the connection following appropriate network protocols and freeing the network port for use of other network connections. Alternatively or additionally, at block 412, audio may stop being provided to the transcription system instead of terminating the network connection.

At block 414, it may be determined if the first voice or the second voice are detected. The first voice or the second voice being detected may indicate that the first voice, the second voice, or both the first voice and the second voice are active. The first voice and second voice may be detected based on monitoring of the first audio and the second audio. When the first voice and the second voice remain inactive, the method 400 may proceed to block 418. When one or both of the first voice and the second voice are detected, the method 400 may proceed to block 416.

At block 416, another network connection with the transcription system may be established. Additionally, the timer started in block 406 may be reset. Alternatively or additionally, at block 416, when audio is stopped from being provided to the transcription system in block 412, audio may again start being provided to the transcription system instead of establishing the network connection.

At block 418, it may be determined if a second time period has passed. The determination of whether the second time period has passed may be based on a comparison of the time indicated by the timer and a second timer period threshold. When the second time period has passed, the method 400 may proceed to block 420. When the first time period has not passed, the method 400 may proceed to block 414.

At block 420, the communication session may be terminated. In some embodiments, terminating the communication session may indicate that the video or audio call between the first device and the second device is terminated.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the communication session may be play back of a message at the second device. In these and other embodiments, the first device may be a database or memory device that stores the message. In these and other embodiments, the method may not consider the second audio in blocks 404, 408, and 414. Rather, in block 404, the method 400 may only determine if the first voice is inactive and in blocks 408 and 414 it may only be determined if the first voice is detected.

Figure 5:
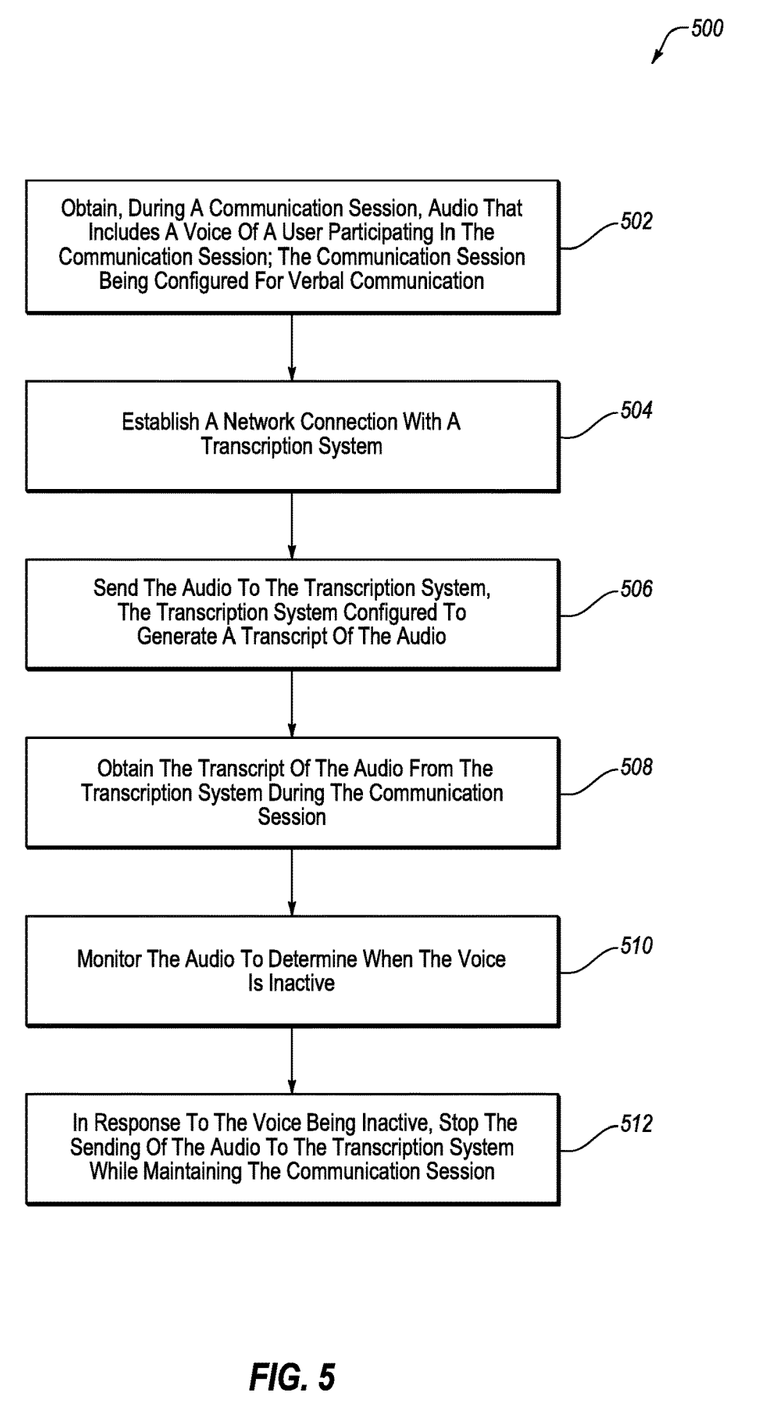
FIG. 5 is a flowchart of another example method to transcribe communications.

FIG. 5 is a flowchart of another example method 500 to transcribe communications. The method 500 may be arranged in accordance with at least one embodiment described in the present disclosure. The method 500 may be performed, in some embodiments, by a device or system, such as the second device 106 of FIG. 1 or the system 300 of FIG. 3, or another device. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where audio that includes a voice of a user participating in a communication session may be obtained. In some embodiments, the communication session may be configured for verbal communication. In some embodiments, the communication session may be a video and audio communication session.

At block 504, a network connection may be established with a transcription system. At block 506, the audio may be sent to the transcription system. In these and other embodiments, the transcription system may be configured to generate a transcript of the audio.

At block 508, the transcript of the audio may be obtained from the transcription system during the communication session. At block 510, the audio may be monitored to determine when the voice is inactive.

At block 512, in response to the voice being inactive, the sending of the audio to the transcription system may be stopped while maintaining the communication session. In some embodiments, stopping the sending of the audio to the transcription system while maintaining the communication session may include terminating the network connection with the transcription system.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 500 may further comprise in response to stopping the sending of the audio to the transcription system and the voice becoming active during the communication session, resending the audio to the transcription system while maintaining the communication session.

In some embodiments, stopping the sending of the audio to the transcription system while maintaining the communication session may occur in response to the voice being inactive for a first time period. In these and other embodiments, the method 500 may further include in response to the voice being inactive for a second time period that is longer than the first time period, terminating the communication session.

In some embodiments, the audio may be obtained from a first device during the communication session and the communication session may be between the first device and a second device. In these and other embodiments, the method 500 may further include obtaining, from the second device during the communication session, second audio that includes a second voice of a second user and monitoring the second audio to determine when the second voice is inactive. In these and other embodiments, stopping the sending of the audio to the transcription system while maintaining the communication session may occur in response to both the voice and the second voice being inactive.

In some embodiments, stopping the sending of the audio to the transcription system while maintaining the communication session may occur in response to both the voice and the second voice being inactive for a first time period. In these and other embodiments, the method 500 may further include in response to both the voice and the second voice being inactive for a second time period that is longer than the first time period, terminating the communication session.

As indicated above, the embodiments described herein may include the use of a special purpose or general purpose computer (e.g., the processor 310 of FIG. 3) including various computer hardware or software modules, as discussed in greater detail below. Further, as indicated above, embodiments described herein may be implemented using computer-readable media (e.g., the memory 312 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method to transcribe communications, the method comprising:

establishing a communication session between a first device of a first user and a second device of a second user, the communication session configured for verbal communication between the first user of the first device and the second user of the second device;

obtaining, at the first device during the communication session, first audio that includes a first voice of the first user, the first audio directed to the second device as part of the communication session;

obtaining, at the first device from the second device during the communication session, second audio that includes a second voice of the second user;

in response to the communication session, establishing a first network connection between the first device and a transcription system;

directing, from the first device, the second audio to the transcription system, the transcription system configured to generate a transcript of the second audio;

obtaining, at the first device, the transcript of the second audio from the transcription system during the communication session;

monitoring the first audio and the second audio to determine when both the first voice and the second voice are inactive;

in response to both the first voice and the second voice being inactive for longer than a first time period, terminating the first network connection between the first device and the transcription system while maintaining the communication session between the first device and the second device, wherein terminating the first network connection between the first device and the transcription system includes freeing a network port in the first device, which is used for the first network connection between the first device and the transcription system, for other network connections; and in response to terminating the first network connection and either of the first voice or the second voice becoming active before a second time period, establishing, by the first device, a second network connection between the first device and the transcription system while maintaining the communication session.

2. The method of claim 1, wherein the communication session is a video and audio communication session.

3. The method of claim 1, further comprising after establishing the second network connection and in response to both the first voice and the second voice being inactive for longer than the second time period, terminating the communication session.

4. The method of claim 1, further comprising after establishing the second network connection and in response to both the first voice and the second voice being inactive for longer than the first time period, terminating the second network connection while maintaining the communication session.

5. A method to transcribe communications, the method comprising:

obtaining, at a first device during a communication session between the first device and a second device, first audio originating from the second device, the first audio including a voice of a user of the second device;

directing, from the first device, second audio to the second device as part of the communication session;

establishing a network connection between the first device and a transcription system;

sending, from the first device, the first audio to the transcription system, the transcription system configured to generate a transcript of the first audio;

obtaining the transcript of the first audio from the transcription system during the communication session;

monitoring the first audio to determine when the voice is inactive; and in response to the voice being inactive, terminating the network connection between the first device and the transcription system while maintaining the communication session, wherein terminating the network connection between the first device and the transcription system includes freeing a network port in the first device, which is used for the network connection between the first device and the transcription system, for other network connections.

6. The method of claim 5, wherein the communication session is a video and audio communication session.

7. The method of claim 5, further comprising in response to terminating the network connection and the voice becoming active during the communication session, establishing a second network connection to thereby resend the first audio to the transcription system while maintaining the communication session.

8. The method of claim 5, wherein terminating the network connection while maintaining the communication session occurs in response to the voice being inactive for a first time period, the method further comprising in response to the voice being inactive for a second time period that is longer than the first time period, terminating the communication session.

9. The method of claim 5, further comprising:

monitoring the second audio to determine when a second voice in the second audio is inactive, wherein terminating the network connection while maintaining the communication session occurs in response to both the voice and the second voice being inactive.

10. The method of claim 9, wherein terminating the network connection while maintaining the communication session occurs in response to both the voice and the second voice being inactive for a first time period, the method further comprising in response to both the voice and the second voice being inactive for a second time period that is longer than the first time period, terminating the communication session.

11. A device comprising:

at least one processor; and at least one non-transitory computer-readable media communicatively coupled to the at least one processor and configured to store one or more instructions that when executed by the at least one processor cause the device to perform operations comprising:

obtain, at the device during a communication session between the device and a second device, first audio originating from the second device, the first audio including a first voice of a user of the second device;

direct, from the device, second audio to the second device as part of the communication session and the second audio including a second voice of a user of the device;

establish a network connection between the device and a transcription system;

send, from the device, the first audio to the transcription system, the transcription system configured to generate a transcript of the first audio;

obtain the transcript of the first audio from the transcription system during the communication session;

monitor the first audio during the communication session to determine when the first voice is inactive;

monitor the second audio during the communications session to determine when the second voice is active;

in response to the second voice being active during the communication session, not sending the second voice, while active during the communication session, from the device to the transcription system for generation of a transcript of the second voice; and in response to the first voice being inactive, stop the sending of the first audio from the device to the transcription system while maintaining the communication session.

12. The device of claim 11, wherein the communication session is a video and audio communication session.

13. The device of claim 11, wherein stopping the sending of the first audio to the transcription system while maintaining the communication session includes terminating the network connection between the device and the transcription system.

14. The device of claim 13, wherein terminating the network connection between the device and the transcription system includes freeing a network port in the device, which is used for the network connection between the device and the transcription system, for other network connections.

15. The device of claim 11, wherein the operations further comprise in response to stopping the sending of the first audio to the transcription system and the first voice becoming active during the communication session, resend the first audio to the transcription system while maintaining the communication session.

16. The device of claim 11, wherein stopping the sending of the first audio to the transcription system while maintaining the communication session occurs in response to the first voice being inactive for a first time period, wherein the operations further comprise in response to the first voice being inactive for a second time period that is longer than the first time period, terminate the communication session.

* * * * *